Patented Aug. 4, 1925.

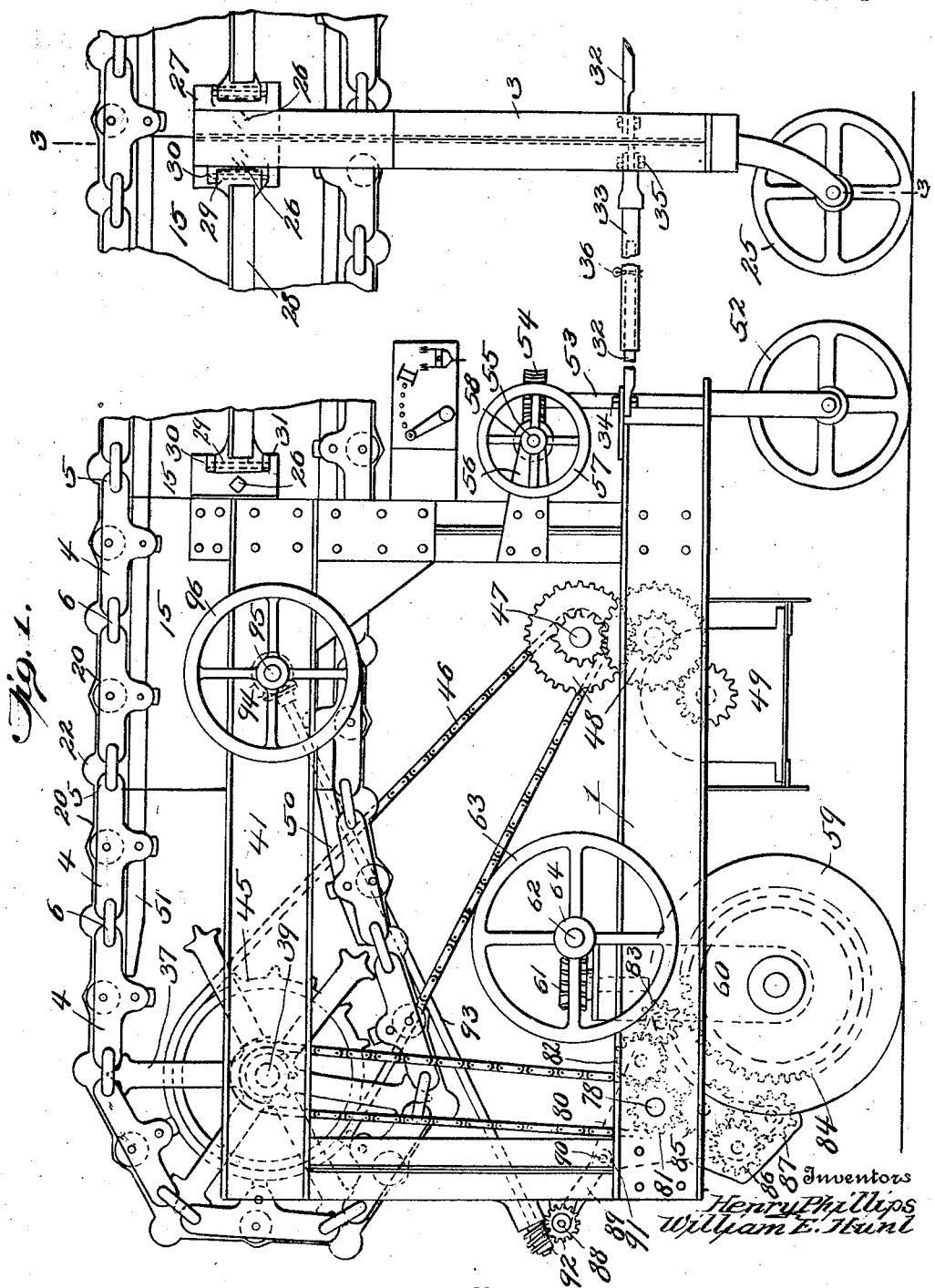

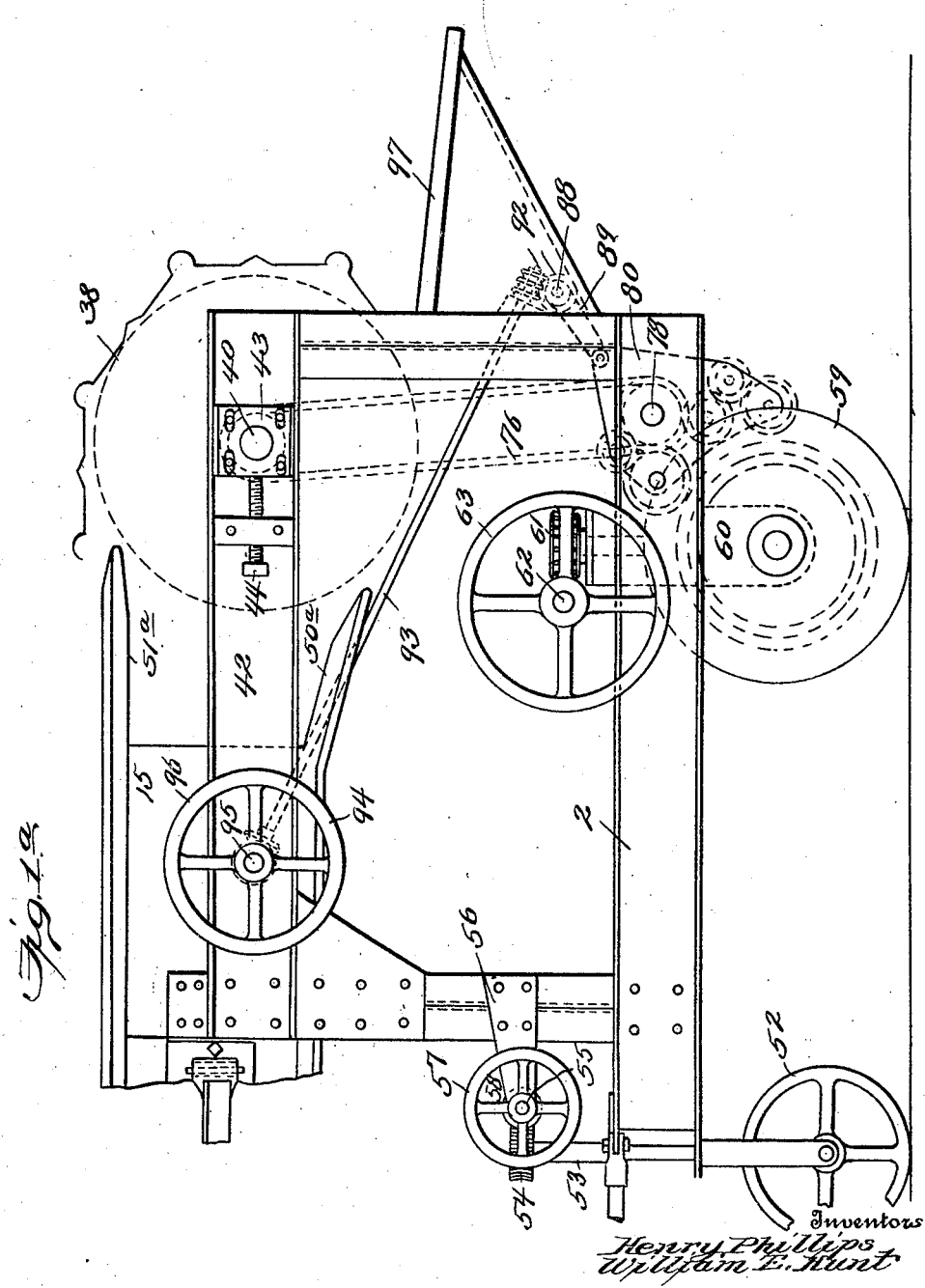

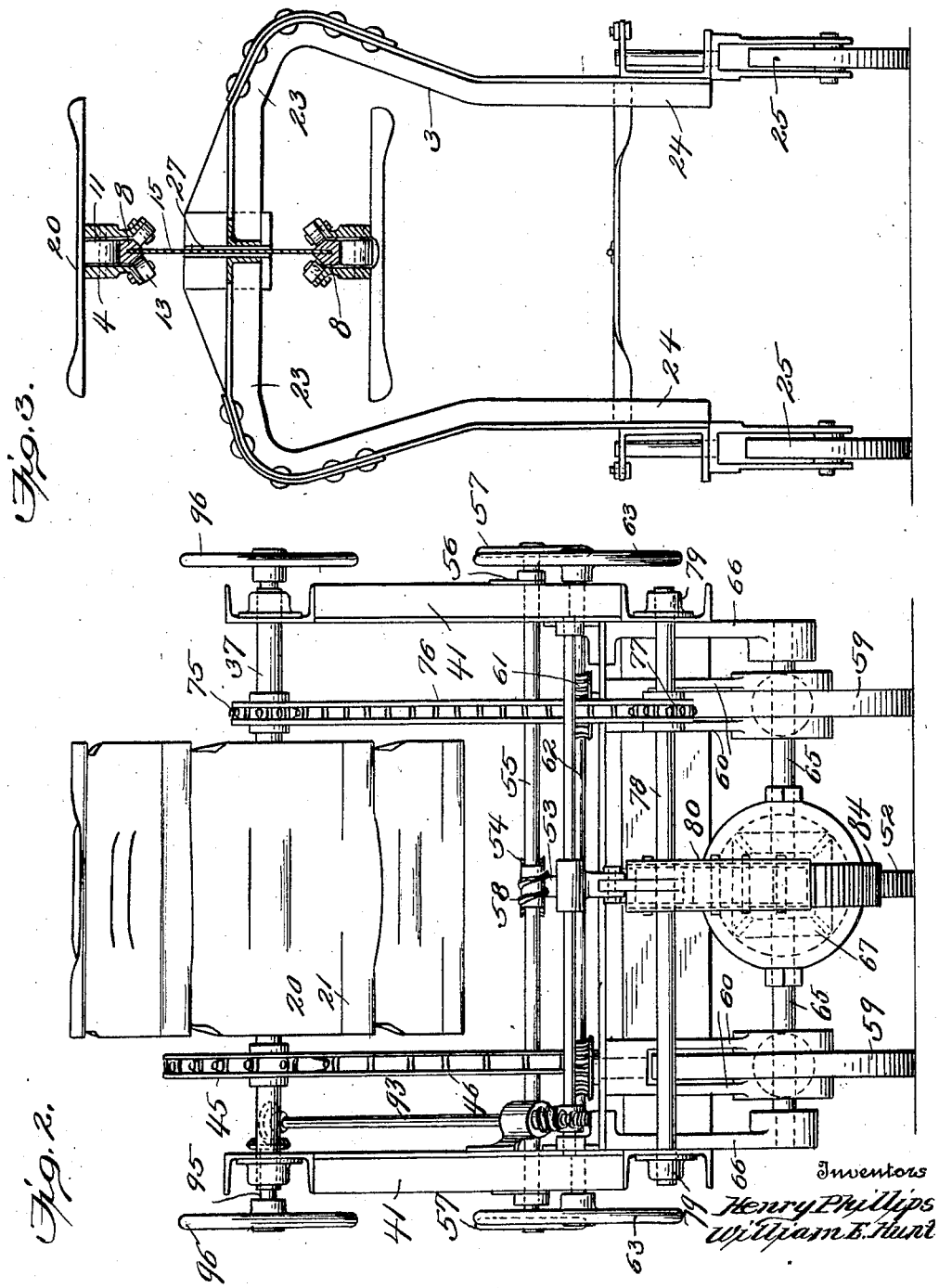

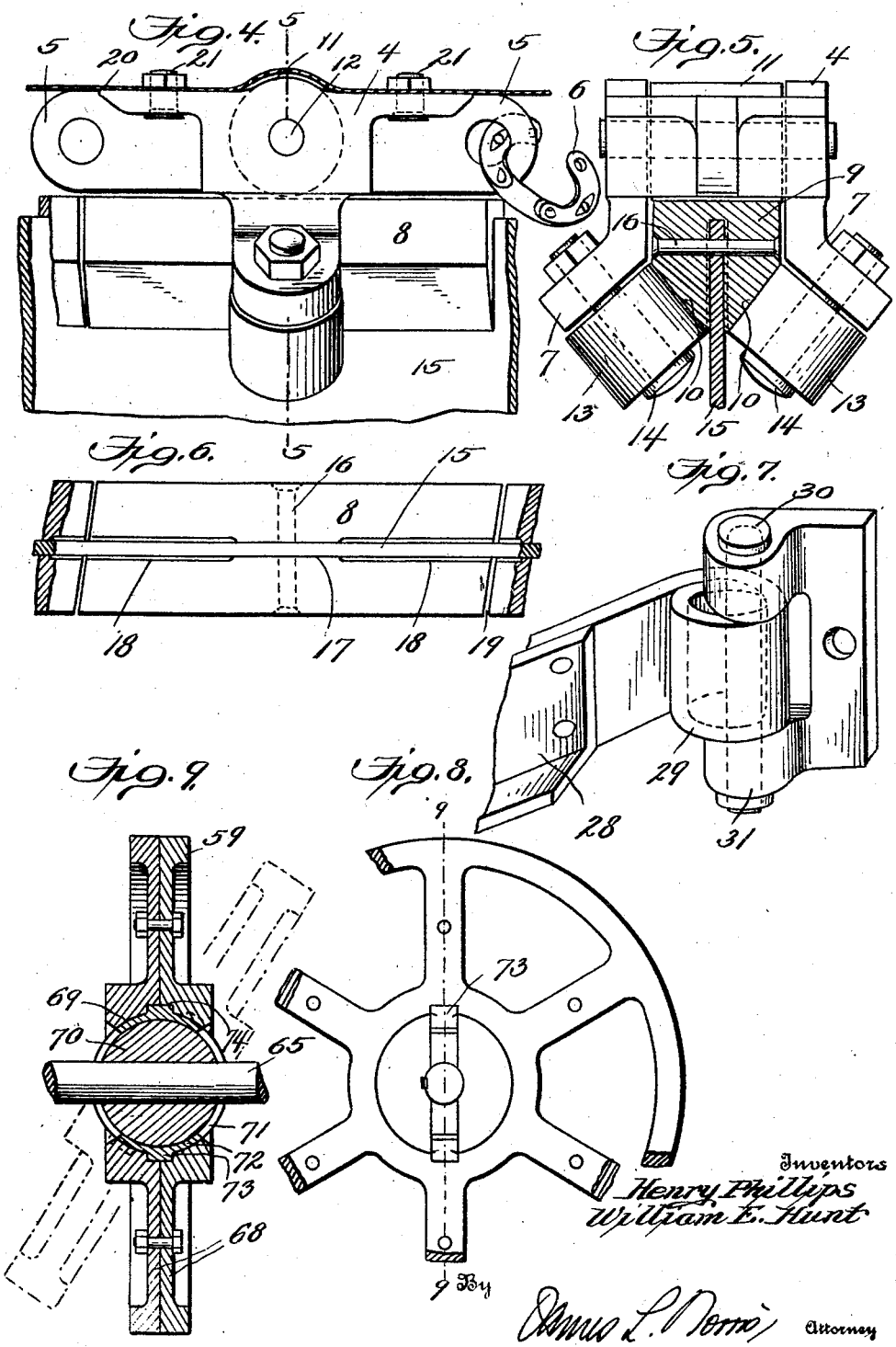

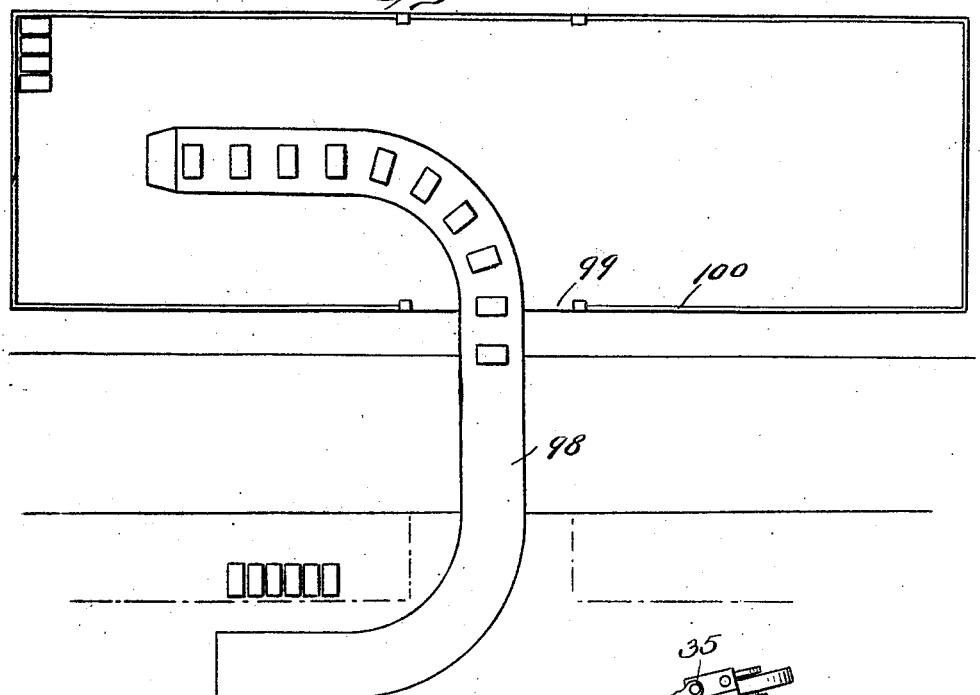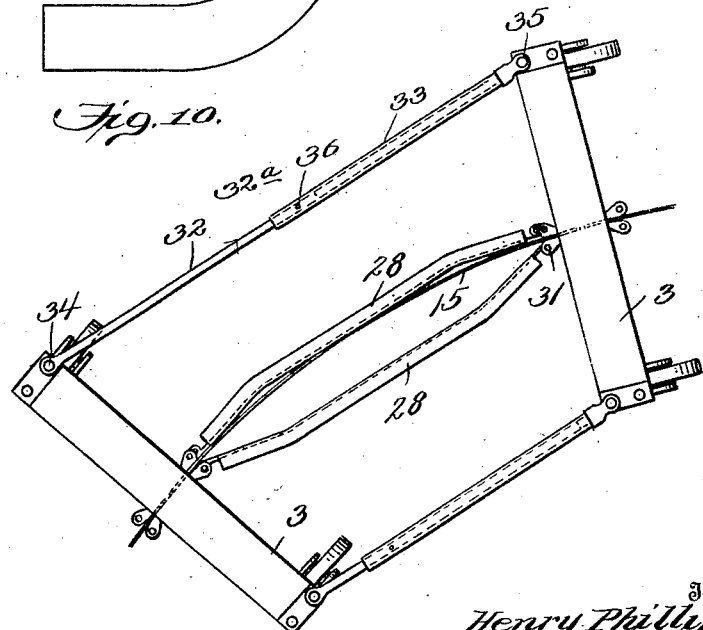

1,548,278

UNITED STATES PATENT OFFICE.

HENRY PHILLIPS AND WILLIAM E. HUNT, OF OTTUMWA, IOWA, ASSIGNORS TO OTTUMWA BOX CAR LOADER COMPANY, OF OTTUMWA, IOWA, A CORPORATION OF IOWA.

PORTABLE FLEXIBLE CONVEYER.

Application filed January 26, 1923. Serial No. 615,081.

*To all whom it may concern:*

Be it known that we, HENRY PHILLIPS and WILLIAM E. HUNT, citizens of the United States, residing at Ottumwa, in the county of Wapello and State of Iowa, have invented certain new and useful Improvements in Portable Flexible Conveyers, of which the following is a specification.

The present invention relates to improvements in apparatus for conveying articles and it is applicable more particularly to the conveying of articles or objects of various kinds, incident to the loading thereof into or the unloading of the same from railway box cars or other transporting vehicles, the transfer of articles or objects into or out of warehouses, factories or other buildings, the conveying of articles or objects from one pile to another, the moving of articles or objects from one part of a yard, factory, warehouse or the like to another part thereof and to a variety of other uses where the ordinary straight conveyer or conveyer of fixed form is unsuitable.

The primary object of the invention is to provide a flexible conveyer which is capable of being curved, bent or otherwise shaped so that it may assume various forms to accommodate it to the different paths of travel of the articles or objects, as determined by the different situations in which the conveyer is used, the conveyer being so constructed and operative that it is capable of conveying the articles or objects efficiently, rapidly and without interruption from the receiving point to the point at which the same are delivered, irrespective to the curvature or other shape which the conveyer may be caused to assume.

Another object of the invention is to provide supporting means for a flexible conveyer which enables the conveyer to be easily and quickly shaped or adapted to the situation in which it is to be used and which renders the structure easily portable, so that it may be moved from one place to another with speed and facility.

Further objects of the invention are to provide novel means for steering the conveyer supporting structure or its parts and for propelling the structure, whereby the shaping of the conveyer and the shifting of the same into operative position to adapt it to the particular situation in which it is to be used and also the transfer of the conveyer from place to place will be facilitated.

To these and other ends, the invention consists in certain improvements and combinations and arrangements of parts, all as will be hereinafter more fully described, the features of novelty being pointed out particularly in the claims at the end of the specification.

In the accompanying drawings:—

Figure 1 is a side elevation of the left-hand end and Figure 1ª is a side elevation of the right-hand end of a flexible, portable conveyer constructed in accordance with the preferred embodiment of the invention;

Figure 2 represents an elevation of the conveyer and its supporting structure as viewed from the left in Figure 1;

Figure 3 represents a transverse section through one of the intermediate units of the conveyer, taken on the line 3—3 of Figure 1;

Figure 4 is a detail view, partly in section, of one of the conveyer links or elements, the same being shown mounted on its track;

Figure 5 represents a transverse section through the conveyer link or element, the section being taken on the line 5—5 of Figure 4, the conveyer tray being omitted;

Figure 6 is a detail view illustrating the preferred mode of mounting the track sections or blocks on the supporting plate or member;

Figure 7 is a detail perspective view showing the preferred mode of mounting the members which limit the extent of bending of the flexible track supporting plate;

Figure 8 is a detail view of the preferred mode of mounting the propelling and steering wheels;

Figure 9 represents a section taken on the line 9—9 of Figure 8;

Figure 10 is a top plan view of one of the intermediate sections of the conveyer illustrating the manner in which the track supporting member of the conveyer flexes and thus accommodates itself to lateral bending of the conveyer structure; and Figure 11 is a diagrammatic view showing as an example the use of the portable, flexible conveyer for the loading or unloading of a railway box car.

Similar parts are designated by the same reference characters in the several views.

The present invention provides a novel conveyer apparatus which is applicable to a variety of uses where packages, articles or other objects are to be conveyed from point to point, and it is more particularly applicable to situations where the ordinary straight conveyer or the conveyer of fixed form is unsuitable, as for example, where the situation requires the run of the conveyer to make one or more turns in order to enable the receiving and delivery ends of the conveyer to be brought to the points where the articles or objects are to be picked up and deposited respectively. For example, in the loading and unloading of railway box cars it is necessary for the conveyer to extend through the door in the side of the car and to then extend in a direction substantially longitudinally, in order to bring the receiving or delivery end of the conveyer, as the case may be, into proximity to the end of the car, while the other end of the conveyer usually requires bending to bring it into substantial parallelism with a platform lying alongside of the car, or to bring it into the desired position within a warehouse, factory or other structure alongside of the car. The invention is also applicable to various other situations which require one or more bends in the conveyer in order that the latter may clear obstructions, or otherwise be adapted to existing conditions. Furthermore, the invention is applicable to various situations where an easily portable conveyer is desired or required, the present invention providing a structure of this character which enables the conveyer to be readily moved from place to place and brought into its operative positions as conditions may require. The portable and flexible features when combined afford a conveyer structure which is capable of being utilized in a great variety of situations and it saves labor and, in consequence, the expense incident to the manual conveying of packages, articles or objects for loading, unloading and similar purposes, accomplishing results which can not be accomplished satisfactorily by conveyers of the ordinary fixed form.

In the accompanying drawings, the preferred embodiment of the invention is shown as applied to a conveyer which is flexible and portable, but it is to be understood that the invention is not restricted to the precise construction shown, as equivalent constructions are contemplated and these will be included within the scope of the claims.

Preferably and as shown in the present instance, the conveyer is mounted on or supported by end units 1 and 2 and a suitable number of intermediate units 3, it being understood that the length of the conveyer may be varied as desired or to meet different requirements and that the number of intermediate units may be consequently varied to suit the length of the conveyer. The conveyer, which is of the endless type, comprises a suitable number of links 4, each link being provided preferably with eyes 5 at its opposite ends which are located in alinement with the longitudinal center of the link, and the links of the series are suitably connected as by the intermediate links 6 which engage in the eyes of the conveyer links. Each conveyer link is preferably in the form of a saddle, the opposed arms 7 of which are adapted to straddle a track on which the conveyer links travel. The track in its preferred form, comprises a series of relatively short track sections or blocks 8 which provides a track surface 9 and also a pair of track surfaces 10 which are convergent, the saddle of the link 4 has a roller 11 journalled therein on the pin 12, this roller being arranged to travel on the track surface 9, and the arms 7 of the link saddle have a pair of rollers 13 journalled on the pins or bolts 14, and these rollers 13 have their axes arranged convergently so that the rollers 13 will travel on the convergent track surfaces 10. Means is provided for supporting the track sections or blocks 8 in a continuous series and in such manner that the track formed by the track sections or blocks 8 may be bent or curved laterally to different extents, although the track sections will be maintained in such relation that they will form a substantially continuous track for the travel of the rollers 11 and 13 of the conveyer links. Preferably and as shown in the present instance, a sectional, laterally bendable or flexible plate or member 15 serves as a support for the track sections or blocks 8, these track sections or blocks being suitably mounted on the upper and lower edges of the sectional plate or member 15, the latter occupying an upright or substantially vertical position. Preferably and as shown, the track sections or blocks 8 are slotted longitudinally on a line between the track surfaces 10 thereof to receive the respective edge of the plate or member 15 and a rivet or other suitable securing means may be passed through the track section or block and the margin of the plate or member 15, in order to secure the track section or block thereon. In order to enable the track section or block to be so secured to the plate or member 15 as to avoid interfering with the lateral bending or flexing thereof, it is preferable to provide the block with a slot 17 at an intermediate point in the block which is approximately of the same width as the thickness of the plate 15, the rivet or equivalent securing device 16 passing through the block and the plate 15 at this point, and relatively wider slots 18 are provided toward the ends of the block to afford ample clearances between the walls of the slots in the block and the sides of the plate or member 15. The plate or member 15 is, therefore, free to bend laterally throughout its length except for the limited areas in the regions of the slots 17. To further facilitate lateral bending or flexing of the plate or member 15, gaps or clearances 19 are provided between the ends of adjacent blocks, and by inclining these gaps slightly, as shown in Figure 5, continuous support is afforded the rollers 11 and 13 while passing from one track section or block to the next section or block. The conveyer links, while travelling along the upper edge of the plate or member 15, are supported by the rollers 11 which travel on the track surface 9, and the rollers 13, which are preferably located in the same vertical plane with the roller 11 and which are in close relation with the track surfaces 10, will serve to steady the respective conveyer link and to thus retain it, together with the respective conveyer tray and the article or object thereon in upright position. The conveyer links which are travelling along the lower edge of the plate or member 15 are supported by the rollers 13 which are then above the track surfaces 10, and the roller 11 in cooperation with the track surface 9 will steady the conveyer links. The conveyer tray 20 carried by each conveyer link may be secured to the latter by bolts 21 or other suitable means, and these trays may be shaped appropriately according to the nature of the article, object or material to be conveyed, although for general purposes a substantially flat tray having an upstanding convex rib 22 along one of its edges is preferable, this rib overlapping the transverse edge of the adjacent tray to provide a joint which renders the conveyer continuous, or substantially so throughout its length, while compensating for a substantial degree of lateral bend in the conveyer and for the passing of the conveyer around its supporting sprockets, to be hereinafter described.

The plate or member 15 which, as previously described, is in sections, is supported by the end and intermediate supporting units of the structure. As shown in Figures 1 and 1ª, the end sections of the plate or member 15 are mounted in the end supporting units 1 and 2, while the intermediate sections of this plate or member are supported by the intermediate supporting units 3. The intermediate flexible plate sections, however, are preferably supported in a manner which will enable these plate sections to accommodate themselves to variations in the elevation of the end and intermediate supporting units of the structure, due to unevenness in the surface on which the structure rests. For example, where, as in the present instance, each intermediate supporting unit 3 comprises complemental frame sections 23, the tops of which are secured at opposite sides of the flexible plate sections 15 and the lower ends of these frame sections form legs 24 which carry casters or supporting wheels 25, a single pivot or bolt 26 may be fitted through plates 27 fixed on the upper ends of the frame sections 23 and through the respective end of the flexible plate section 15, the adjacent plate sections 15 which join at this point being in alinement with a sufficient gap or clearance between them to allow an upward and downward deviation between the plate sections and thus compensate for a variation between the height of the intermediate supporting unit at this point and the adjacent supporting units. Means is also preferably provided for preventing undue bending or buckling of the flexible plate sections 15. As shown in the present instance, a pair of reversely bowed substantially rigid rails 28 extend through substantially the length of each intermediate supporting unit, these rails being located at opposite sides of the respective flexible plate section 15 and serving as abutments or stops to prevent further bending of the plate section after it has been flexed to a predetermined limit, as determined by the amount of bowing of these rails 28. These rails are so mounted as to avoid interference with relative angular movements between adjacent intermediate supporting units incident to lateral bending of the conveyer structure. As shown in the present instance, the ends of each rail are provided with hinged members 29 which are engaged by hinge pins 30 attached to knuckles 31, the latter being secured to or formed as parts of the plates 27, lost motion being provided, as by elongating the pivot holes in the hinge members 29 to allow for variations in the angularity of the intermediate supporting units, incident to lateral bending of the conveyer. These rails 28 are located at a level between the upper and lower tracks on the track supporting plate or member 15, so that they avoid interference with the travelling conveyer links. The legs of the intermediate supporting units are preferably connected by spacing members which permit the intermediate supporting units to assume different angular relations, incident to the lateral bending of the conveyer and to retain these intermediate units in place. For example, as shown, longitudinally adjustable spacing members may be used which comprise telescopic or slidably related members 32 and 33, the outer ends of which are pivotally connected at 34 and 35 to the respective intermediate supporting units and the adjacent ends of which may be overlapped, and one of the members, the member 32 in the present instance, is provided with a series of longitudinally spaced holes 32ª to receive a locking pin 36. It will be understood that these spacing members may also be provided between the respective end sections 1 and 2 and the intermediate supporting sections adjacent thereto.

The ends of the conveyer pass over sprocket wheels 37 and 38, either one or both of which may serve to drive the conveyer, these sprocket wheels being mounted on shafts 39 and 40, the latter being suitably journalled in the frames 41 and 42 of the respective end sections 1 and 2. In the present instance, the sprocket wheel 37 is utilized to drive the conveyer, while the sprocket wheel 38 serves as an idler, and the shaft 40 of the sprocket wheel 38 may be journalled in a bearing 43 which is shiftable longitudinally of the frame 42, under the action of a screw 44, or other suitable device, whereby slack in the conveyer may be taken up. The shaft 39 of the driving sprocket 37 may receive motion in any suitable way from a motor or other source of power. In the present instance, the shaft 39 has a sprocket wheel 45 which is fixed thereon and cooperates with a sprocket chain 46, the latter being driven from a sprocket wheel which is fixed on a shaft 47, and the latter may be driven through suitable speed reduction gears 48 from an electric motor 49, which latter may be carried by the end unit 1. Where, as in the present instance, the sprocket wheels 37 and 38 are larger in diameter than the vertical height of the sectional plate 15, suitably inclined lower track members 50 and 50ª may be provided on the lower edges of the plate sections 15 carried by the supporting units 1 and 2 to properly direct or guide the conveyer in passing between these sprocket wheels and the track, and similar track extensions 51 and 51ª may be provided adjacent to said sprocket wheels to guide or support the conveyer links with respect to the track on the upper edge of the sectional plate or member 15. It will be understood that the endless conveyer is adapted to move continuously around the sprocket wheels 37 and 38 and to travel in one direction along the upper edge of the sectional plate or member 15, the trays on the conveyer links being then in position to receive, support and convey the articles, objects or other material to be handled, and that the conveyer links have a return movement along the lower edge of the sectional plate 15, the conveyer links during the return movement being inverted. The supporting structure for the conveyer is such that the conveyer links, while passing along the upper edge of the sectional plate 15 are above and clear of the supporting structure and these links during their return movement along the lower edge of the plate 15 operate in a passageway which is formed between the legs 24 of the intermediate supporting units.

The supporting structure for the conveyer is preferably provided with wheels or equivalent means, by which this structure as a whole or portions thereof, may be shifted or transported in directions both longitudinally and laterally with respect to the conveyer, thus facilitating movement of the structure from place to place and the bringing of the structure into operative position, as well as removal therefrom. In the present instance, each intermediate supporting unit is provided, as previously stated, with caster wheels 25 which have swivel connections to these respective units, and hence enable the intermediate units to move longitudinally or transversely with respect to the conveyer or in a direction having both longitudinal and transverse components, the caster wheels having a trailing action, and hence accommodating themselves automatically to the direction in which the respective intermediate units are shifted, maintaining, however, at all times their supporting function for these intermediate units. Each of the units 1 and 2 may be provided, as shown in the present instance, with duplicate supporting wheels and these wheels are preferably provided with steering means by which they may be set to determine or control the direction in which the respective unit will travel. For example, as shown in the present instance, one end of each end unit may be provided with a supporting and steering wheel 52, which is carried by an upright shaft 53 journalled in the framework of the unit, and provided with steering means by which it may be set angularly to direct the course of the respective unit. As shown, the upper end of the shaft 53 of the wheel 52 has a worm wheel 54 fixed thereon and a cross shaft 55, which is suitably journalled in brackets 56 and may have a hand wheel 57 on each of its ends, carries a worm 58 which engages the worm wheel 54. Operation of the steering shaft 55 will, therefore, set the supporting and steering wheel 52 in different angular positions, as may be required, in order to steer the corresponding end of the respective end unit in the desired direction. The opposite end of each end unit is supported by a pair of wheels 59 and these wheels are provided with steering means, by which they may be simultaneously set to steer the corresponding ends of the respective end units. As shown, each wheel 59 is revoluble between the arms of a fork 60 and the upper end of each fork has a worm wheel 61 fixed thereon.

A steering shaft 62 is provided for these wheels, it being appropriately mounted in the framework of the unit and may have hand wheels 63 thereon, this shaft being provided with a pair of worms 64 which engage the worm wheels 61, so that rotation of the steering wheel 63 will act through the worms and worm wheels to simultaneously set the pair of wheels 59 in appropriate angular positions to effect steering, as may be desired.

Either or both of the end sections 1 and 2 is also preferably provided with power means for propelling it for the purposes of moving the conveyer structure from one place to another and for moving the conveyer structure into and out of operative position. As shown in the present instance, the supporting and steering wheels 59 also serve as propelling wheels, for which purpose they are mounted on a pair of drive shafts 65, the outer ends of these shafts being supported in the brackets 66 which extend downwardly from the main frame of the respective units and the inner ends of these shafts are connected to a differential 67 which functions like the ordinary differential to transmit power to both shafts at all times and to compensate for variations in the relative speeds of the shafts such as take place when the wheels 59 are travelling in any course other than a straight course. Suitable universal drive connections are provided between the shafts 65 and the wheels 59, whereby power will be transmitted from the shafts to the wheels, although the wheels 59 may be set in different angular relations to these shafts. For example, each of the wheels 59 may be of split construction, as shown in Figure 9, the complemental halves 68 being bolted or otherwise secured together, and the complemental hub portions of the wheel halves are formed with a spherical socket 69 to receive a ball 70 which is keyed or otherwise fixed on the respective drive shaft 65. The ball 70 is formed with a circumferential groove 71 which lies in a plane parallel to the axis of the shaft, and this groove slidingly receives a pair of keys 72 which are provided at their outer sides with trunnions or cylindrical studs 73, the latter fitting rotatably in correspondingly shaped recesses 74 arranged diametrically opposite to one another and in the wall of the spherical socket 69. By this construction, the wheel will maintain its driving connection with the respective drive shaft, irrespective of variations in the angular relation between the wheel and shaft, and the vertical arms of the respective fork 60 will engage the opposite sides of the hub of the wheel and thereby maintain the wheel in upright position, although rotation of the fork about a vertical axis will set the wheel in different angular positions relatively to the shaft, considered with respect to the horizontal plane. The full and dotted lines, for example, in Figure 9, show two angular positions of the wheel relatively to the drive shaft, these two positions being taken with respect to the horizontal plane.

Power may be taken conveniently from one or both of the conveyer sprocket shafts 39 and 40 for propelling purposes. In the present instance, substantially duplicate mechanisms are employed to drive the wheels 59 of both end units from the shafts 39 and 40 respectively. As shown, for example, in Figure 2, the shaft 39 has a sprocket 75 fixed thereon to drive a chain 76, the latter engaging a sprocket 77 on a cross shaft 78, the latter being journalled in suitable bearings 79 in the sides of the main frame of the end unit 1. This same mechanism may be duplicated on the end unit 2. Power is taken from the shaft 78 to the differential 67 through suitable mechanism, which preferably embodies reversing means by which the wheels 59 may be driven in either direction, although the shaft 78 may always revolve in the same direction. As shown in the present instance, a housing 80 is mounted on the intermediate portion of the shaft 78 and the intermediate portion of the shaft 78 has a pinion 81 fixed thereon. The housing 80 has loosely journalled therein pinions 82 and 83 which are driven from the pinion 81, the pinion 83 being arranged to mesh with a drive gear 84 fixed on the differential 67 when the housing 80 is swung in one direction about the shaft 78 as an axis, the differential, and hence the wheels 59 being thus driven in one direction; and the housing 80 has also loosely journalled therein gears 85 and 86 which mesh with one another and with the pinion 81, and also a driving pinion 87, the latter, when the housing 80 is swung in an opposite direction about the shaft 78 as an axis, engaging the drive gear 84 on the differential and thus driving the differential and, in consequence, the wheels 59 in an opposite direction. The drive pinions 83 and 87 are so located on the housing 80 that when the latter is in an intermediate position both pinions will be out of engagement with the driving gear 84. Different means may be provided for shifting the housing 80 about the shaft 78 as a center, to bring one or the other of the pinions 83 and 87 into operative relation with the drive gear 84. For example, as shown in the present instance, a shaft 88 may be mounted in the main frame of the unit and provided with an arm 89 which is fixed thereon, this arm carrying a pin 90 which operates in a slot or enlarged hole 91 in the housing 80, so that rotation of the shaft 88 and, in consequence, swinging motion of the arm 89 will act to rock or shift the housing 80 about the shaft 78 as a center. The shaft 88 may be actuated or controlled in any suitable way, it being provided in the present instance with gearing 92 which connects it to a shaft 93, this shaft 93 in turn being connected by gearing 94 to a cross shaft 95. The shaft 95 may be journalled in the sides of the frame of the unit and provided at opposite sides thereof with hand wheels 96 by means of which an attendant may easily set or control the driving means to propel the unit in either direction, as circumstances may require. A duplicate reversible drive mechanism and controlling shaft therefor may be provided on the end unit 2, the operation thereof corresponding with the operation of such mechanism on the unit 1, but where a single motor or source of power is used for the entire conveyer apparatus, as is shown in the present instance, the propelling mechanism for one of the end units, the end unit 2 in the present instance, will be transmitted through the travelling conveyer which then acts as a power transmission medium. One of the end units, the end unit 2 in the present instance, is provided with a shelf or apron 97 which may be used as a support upon which the articles or objects may be placed prior to the placing of the articles or objects on the conveyer trays, or this shelf or apron may be otherwise used to facilitate the loading of the articles or objects on to the conveyer. The articles or objects may be removed from the opposite end of the conveyer by hand, or they may be delivered to any suitable receiving apparatus.

In using conveying apparatus constructed as hereinbefore described, the travelling conveyer may be driven continuously by the electric motor 49 or any other suitable source of power and this same motor or source of power may be utilized to propel the apparatus for the purpose of moving it from one place to another and for bringing the apparatus into the position in which it is to be used and for removing it from such position. The apparatus is particularly adapted for use where one or more curves or bends must be made in the path of the articles or objects while they are being conveyed from the receiving and to the delivery point. For example, Figure 11 shows diagrammatically the form which the conveyer apparatus must assume in order to properly reach through the side door and into one end of an ordinary railway box car for the loading or unloading thereof, 98 representing diagrammatically the conveyer apparatus which extends through the side door 99 of a railway box car 100, the inner end bending laterally at approximately a right angle so as to reach to or toward one end of the car and the outer end of the conveyer apparatus resting on a platform alongside of the car or the floor of a warehouse, factory or the like and bending laterally at approximately a right angle to bring it alongside a pile of articles or objects or a platform therefor.

The conveyer apparatus provided by the present invention is particularly adapted to meet the requirements of such a situation and of similar situations where one or more lateral bends in the conveyer is necessary or desirable, as the travelling conveyer is capable of bending laterally and of operating to efficiently convey the articles or objects around one or more lateral bends in the conveyer, and the laterally flexible plate and the sectional track thereon enables the conveyer to be bent laterally into the shape required or desired and it functions to efficiently support the conveyer notwithstanding that the latter may have one or more lateral bends in its run. Furthermore, the laterally flexible track supporting plate is mounted on the end and intermediate units which are self-supporting, and hence the track plate will be properly supported at suitable intervals in its length and hence the conveyer will be properly supported irrespective of its lateral shape. This laterally-flexible track supporting plate, although it is preferably made in sections, as shown, in order that the different intermediate conveyer supporting units may accommodate themselves to vertical inequalities in the platform or surface on which they rest, constitutes, in effect, a continuous longitudinal member which defines the path over which the conveyer links travel, and by locating the plate in vertical alinement with the central pivotal connections between the conveyer links, as herein shown, the length of the conveyer remains constant or substantially so, notwithstanding that various numbers and shapes of lateral bends may be formed in the conveyer, and hence interference with the lateral bending of the conveyer to meet different situations, or with correct operation of the conveyer, is avoided.

By providing one or both of the end units with steering and propelling means, the apparatus is rendered portable so that it may be easily and quickly moved from one place of operation to another, thus adapting one conveying apparatus to a variety of uses, and moreover, the steering and propelling means on one or both end units enables the manipulation of the apparatus to bring it into operative position, and to remove it therefrom, to be accomplished with facility. For example, the steering and propelling means on the end unit which is to be introduced into a car or the like will draw and guide that end of the conveyer into the car while the steering and propelling means on the other end unit may be guided to push the intermediate portion of the conveyer at such angle to bend it laterally into the required or desired shape. Also, when the conveyer has one or more lateral bends therein, as for instance, when it is in operative position and it is desired to straighten it, one of the end sections may be propelled and guided in a direction away from and toward a position in longitudinal alinement with the other end section, the tension thus applied to the intermediate portion of the conveyer causing it to straighten. In each instance, the bending or straightening of the conveyer is facilitated by the casters on the intermediate supporting units which accommodate themselves to the direction of the force applied to the intermediate portion of the conveyer tending to shift it laterally or diagonally.

We claim as our invention:

1. A conveyer comprising a relatively flat supporting member composed of a strip of flexible material which is bendable in a direction laterally of the length of the conveyer, and conveying means mounted on an edge of said member.

2. A conveyer comprising conveying means, and a single supporting member therefor embodying a strip of bendable material which extends longitudinally of the conveyer in a position intermediately of the width thereof and is flexible in a direction laterally of the length of the conveyer.

3. A conveyer having a longitudinal supporting member composed of a strip of flexible material set edgewise vertically and which is rigid vertically and inherently flexible in a direction laterally of the length of the conveyer, and conveying means mounted centrally of its width on an edge of said member.

4. A conveyer comprising a plurality of supporting sections each of which is flexible in a direction transversely of its length, and supports arranged intermediately of the length of the conveyer and capable of accommodating themselves to lateral flexing of the respective conveyer supporting sections.

5. A conveyer comprising a supporting section which is flexible laterally, supports for the ends of said section capable of moving angularly relatively to one another to accommodate themselves to lateral flexing of the conveyer section, and means connecting said supports to hold them in fixed angular relation to one another, thus retaining the conveyer section in a given form.

6. A conveyer comprising an endless travelling conveyer element, a strip of flexible material forming a laterally bendable member, and a track mounted on an edge of said strip and on which said conveyer element travels.

7. A conveyer comprising travelling tray-carrying means, and a member composed of flexible material having a track thereon for supporting said tray-carrying means and flexible laterally to form a curved path for the travel of the tray-carrying means.

8. A conveyer comprising a linked travelling tray-carrying element, and a supporting member composed of flexible material of substantially flat form having a track on an edge to guide said travelling element and bendable laterally to form a curved path for the travel of said element.

9. A conveyer comprising an endless travelling element, and a supporting member therefor composed of flexible material having tracks on its opposite edges for guiding said element and bendable laterally to form a laterally-deflected path for the travel of said element.

10. A conveyer comprising an endless travelling element, a supporting member located between opposed stretches of said travelling element and composed of a strip of flexible material flexible laterally relatively to the length of said element, and tracks on said member on which said stretches of the element travel, said tracks being conformable with lateral flexing of said member and adapted to cause said stretches of the travelling element to take a laterally-deflected path.

11. A conveyer comprising an endless travelling conveying element, laterally flexible supporting means arranged between opposed stretches of said element and embodying a flat strip of flexible material set edgewise vertically, and sectional tracks on the edges of said strip on which said conveying element travels.

12. A conveyer comprising a flexible travelling conveyer element, a substantially flat strip of flexible material forming a laterally bendable supporting member, and a sectional track on an edge of said member and on which said conveyer element travels.

13. A conveyer comprising a flexible travelling conveyer element, a sectional supporting member embodying a flat strip of flexible material which is bendable in a direction laterally of the length of the conveyer and having a track along which said conveyer element travels and which is capable of conforming with the bending of said supporting member.

14. A conveyer comprising a flexible travelling conveyer element, a sectional supporting member embodying a flat strip of flexible material having a track thereon along which said conveyer element travels, and supports on which the sections of said member are mounted, said supports being relatively movable angularly to permit lateral bending of said supporting member and having means for retaining them in fixed angular relation to hold said member in laterally bent form.

15. A conveyer comprising a flexible travelling conveyer element, a supporting member extending along the length of said element and embodying a flat strip of flexible material which is bendable in a direction laterally of the length of the conveyer, a plurality of spaced units supporting said member at intervals in its length, and means for limiting the amount of lateral flexing of said member.

16. A conveyer comprising a flexible travelling conveyer element, a supporting member in sectional form and carrying a track along which said conveyer element travels, each section of said member being flexible laterally, supporting units connecting the adjacent ends of the sections of said member, and rails extending alongside each section and connecting adjacent supporting units to limit the extent of lateral flexing of the respective section.

17. A conveyer comprising a flexible travelling conveyer element, a plurality of longitudinally spaced supporting units, a laterally flexible member embodying a strip of bendable material extending longitudinally of and connecting said units and having a track conformable with lateral flexing of said member and along which the conveyer element travels, and means cooperative with said units to retain said member in different flexed forms.

18. A conveyer comprising a travelling conveyer element, a supporting member therefor embodying sections each of which is composed of a strip of flexible material which is bendable laterally, a plurality of supporting units to which the adjacent ends of said sections are connected to permit relatively vertical movements between said units, means connecting adjacent units to limit the degree of lateral flexing of the respective sections of said member, and means connecting said units for holding them in fixed relation, thus retaining said supporting member in laterally-flexed form.

19. A conveyer comprising a travelling conveyer element, a strip of bendable material forming a laterally flexible supporting member therefor, a series of units for supporting said member at intervals in its length, said units being relatively movable angularly to permit lateral flexing of said member, and propelling and steering means for the end units of the series.

20. A support for a travelling conveyer element comprising a substantially flat laterally flexible member, and a track secured to an edge of said member, the track embodying sections each of which is slotted to fit over said edge of the member.

21. A support for a travelling conveyer element, comprising a laterally flexible plate having a sectional track along an edge thereof each section of the track being slotted to fit the edge of said plate, said slot being provided with widened portions toward the ends of the sections to afford clearances for the flexing of the plate.

22. A conveyer comprising a travelling conveyer element embodying links each having a saddle provided with rollers, and a track having a surface to cooperate with one of the rollers on the saddle and a pair of convergent surfaces with which other rollers on the saddle cooperate.

23. A conveyer comprising a linked conveyer element, a plate having a track section secured to an edge thereof, said track section having a track surface overlying the edge of the plate and a pair of track surfaces which are convergent from the sides and inwardly toward the plate, and rollers on each link of the conveyer element arranged to cooperate respectively with said track surfaces.

In testimony whereof we have hereunto set our hands.

WILLIAM E. HUNT.
HENRY PHILLIPS.